Aug. 26, 1930.  J. L. ROUSSEY  1,773,792
ANIMAL POKE
Filed July 26, 1929
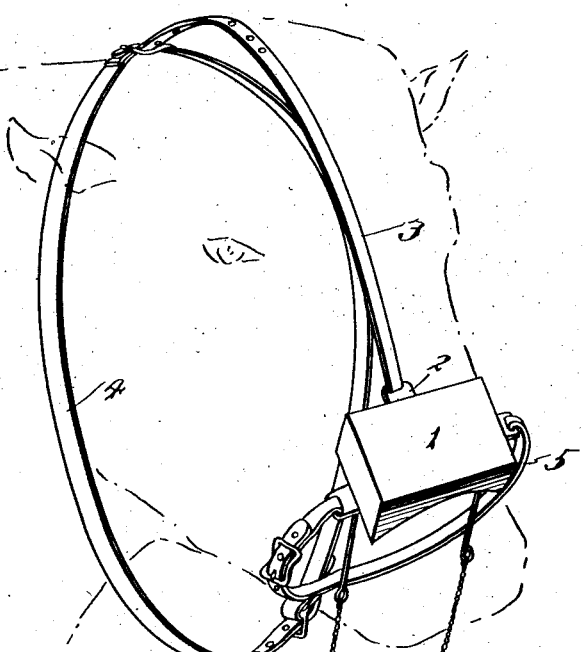
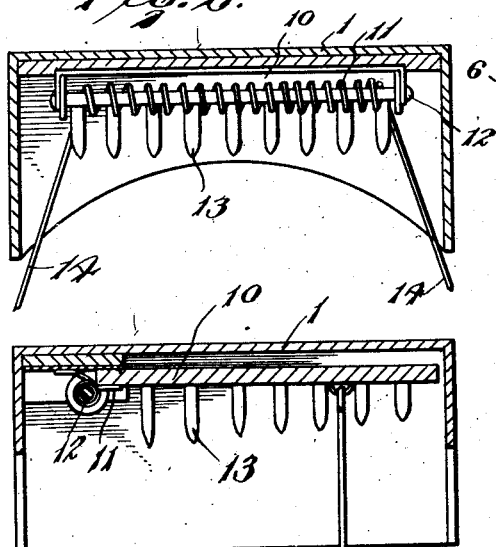
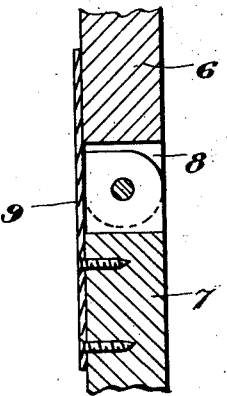
Inventor
J. L. Roussey
By Lacey & Lacey, Attorneys Patented Aug. 26, 1930

1,773,792

UNITED STATES PATENT OFFICE

JOHN L. ROUSSEY, OF ROME CITY, INDIANA

ANIMAL POKE

Application filed July 26, 1929. Serial No. 381,243.

The object of this invention is to provide a simple and easily applied device which may be fitted to the head of a grazing animal and which will operate efficiently to permit the animal to graze uninterruptedly but will prick the animal's nose if an attempt be made to jump over or run through a fence. The invention is illustrated in the accompanying drawing and will be hereinafter fully set forth.

In the annexed drawing:

Figure 1 is a perspective view of a device embodying the invention, the position of the same upon the head of an animal being indicated, Figs. 2 and 3 are transverse and longitudinal sections through the box showing the means for mounting the nose-pricking plate, and Fig. 4 is an enlarged detail section through the joint of the barrier stick.

In carrying out the present invention, there is provided a box 1 which is open at its bottom and is suitably shaped on its bottom edges to fit over the animal's nose, as clearly shown in Fig. 1. Connected to the rear side of the box 1 in any convenient manner, as by being passed through a lug 2 projecting from the box, is a head strap 3 which passes up over the head of the animal between the ears and is attached at its rear end to a throat strap 4 which passes around the neck of the animal and is fastened beneath the throat. The throat strap and the head strap 3 may be equipped with any form of buckle or other fastening which will permit the proper adjustment of the same, as is obvious. Attached to the sides of the box 1 are the ends of a nose strap 5 which passes around the nose of the animal and is fastened beneath the chin, the box being thus held over the nose in such a position that the animal may graze freely. Carried by and depending from the throat strap 4 is a stick consisting of an upper member 6 and a lower member 7 pivotally connected by a tongue and mortise joint, as indicated at 8, the lower section having secured to its rear side a stop plate 9 which projects upwardly and is adapted to bear against the rear of the upper section, as shown clearly in Fig. 4. Within the box 1 is hingedly mounted a plate 10 which normally is held up against the top plate or roof of the box by a torsion spring 11 wrapped around the hinge pin 12 by which the plate is held within the box. Carried by this plate 10 are a plurality of spurs or teeth 13 which are adapted to prick the nose of the animal if a force overcoming the spring 11 be applied to the plate 10. It is intended that such a force be applied whenever the animal runs against a fence and to that end flexible connections, as chains 14, are attached to the pricking plate 10 adjacent the free end thereof and extend downwardly therefrom at opposite sides of the animal's nose and at their lower ends are provided with snap hooks or other removable fastenings 15 which are engaged in an eye or clip 16 upon the upper member 6 of the stick. It will now be readily understood that, when the animal's head is lowered to the ground as in the act of grazing, the lower section 7 of the stick will fold upwardly so that the grazing of the animal will not be interfered with in any manner. If, however, the animal runs against a fence, the lower end of the stick will be swung backward by its contact with the fence wires and inasmuch as the backward movement relative to the upper section of the stick is prevented by the plate 9, a pull is exerted upon the chains or other connections 14 which swings the pricking plate downward and causes the spurs or teeth 13 to bear upon the nose of the animal, whereupon the animal will at once withdraw from the fence. The pressure upon the stick and through the stick upon the pricking plate being thus relieved, the spring 11 at once swings the plate upward to its normal position.

It will be noted that I have provided an exceedingly simple device which may be easily applied to the head of an animal and when applied will be secured in such a manner that it cannot be easily detached. The device will operate entirely automatically so that the wire fence around grazing fields or pastures will be protected against damage from fractious animals and the animals will be protected against injury from contact with the fence while their feeding will be freely permitted.

Having thus described the invention, I claim:

An animal poke comprising a box adapted to rest over the nose of an animal, a head strap connected to said box and extending upwardly over the animal's head, a throat strap attached to the rear end of the head strap and passing around the animal's neck, a nose strap attached to the sides of the box and extending around and under the animal's nose, a pricking plate mounted within the box, yieldable means for holding said plate normally away from the animal's nose, a stick suspended from the throat strap, and flexible connections between the stick and the pricking plate whereby to permit grazing of the animal but to cause the pricking plate to exert pressure on the animal's nose when the stick is brought into contact with a barrier.

In testimony whereof I affix my signature.

JOHN L. ROUSSEY. [L. S.]